Patented Oct. 16, 1951

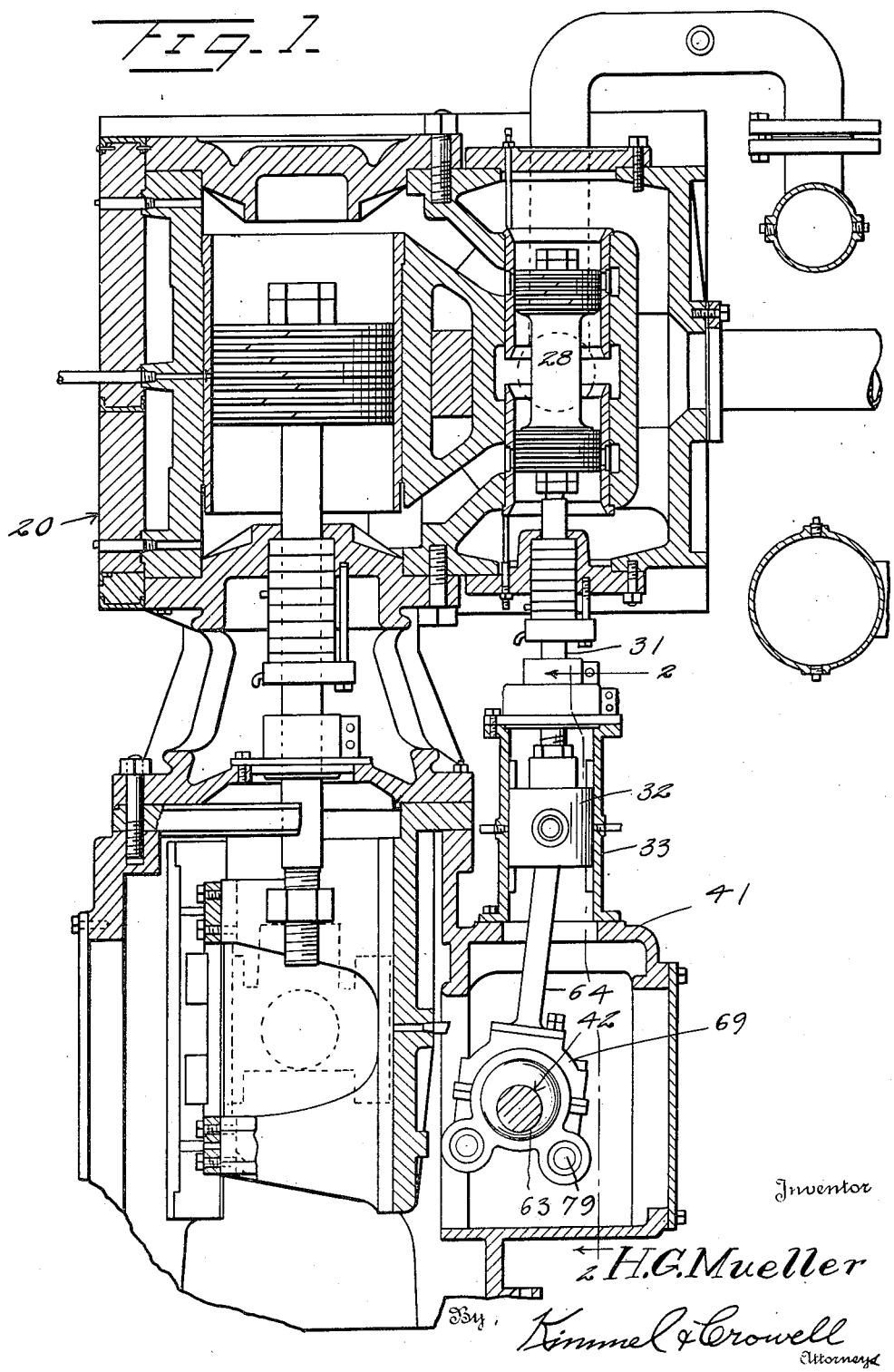

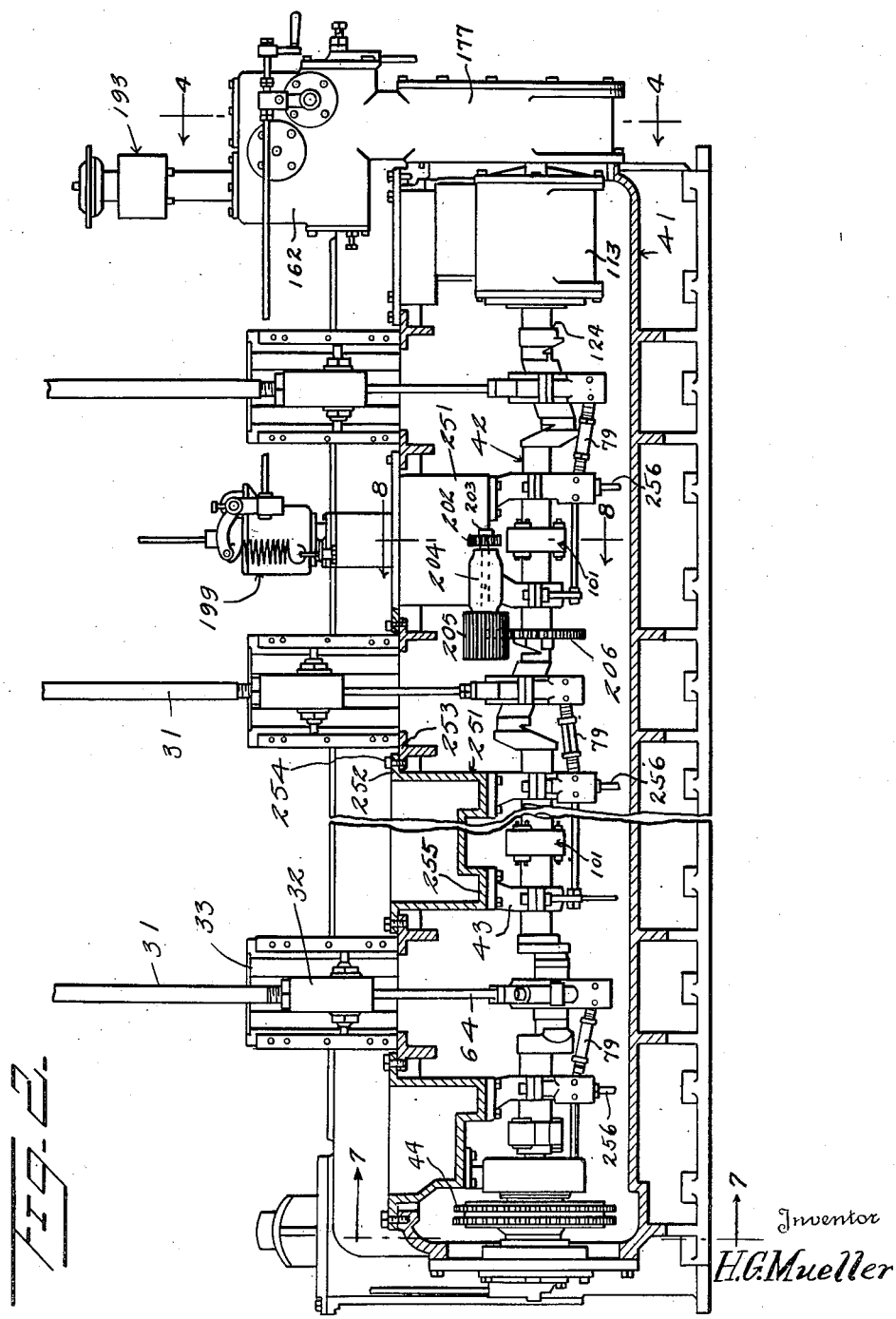

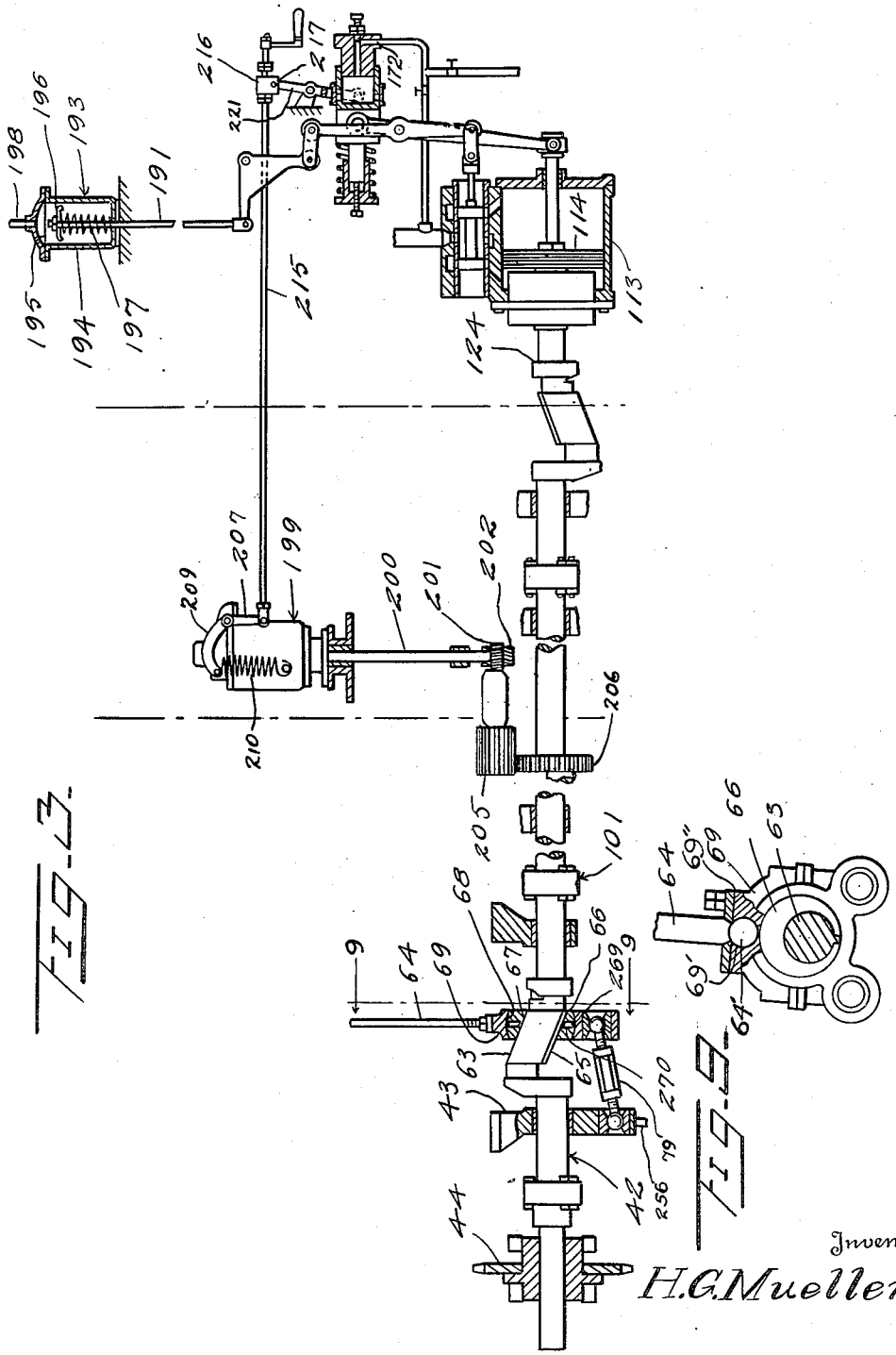

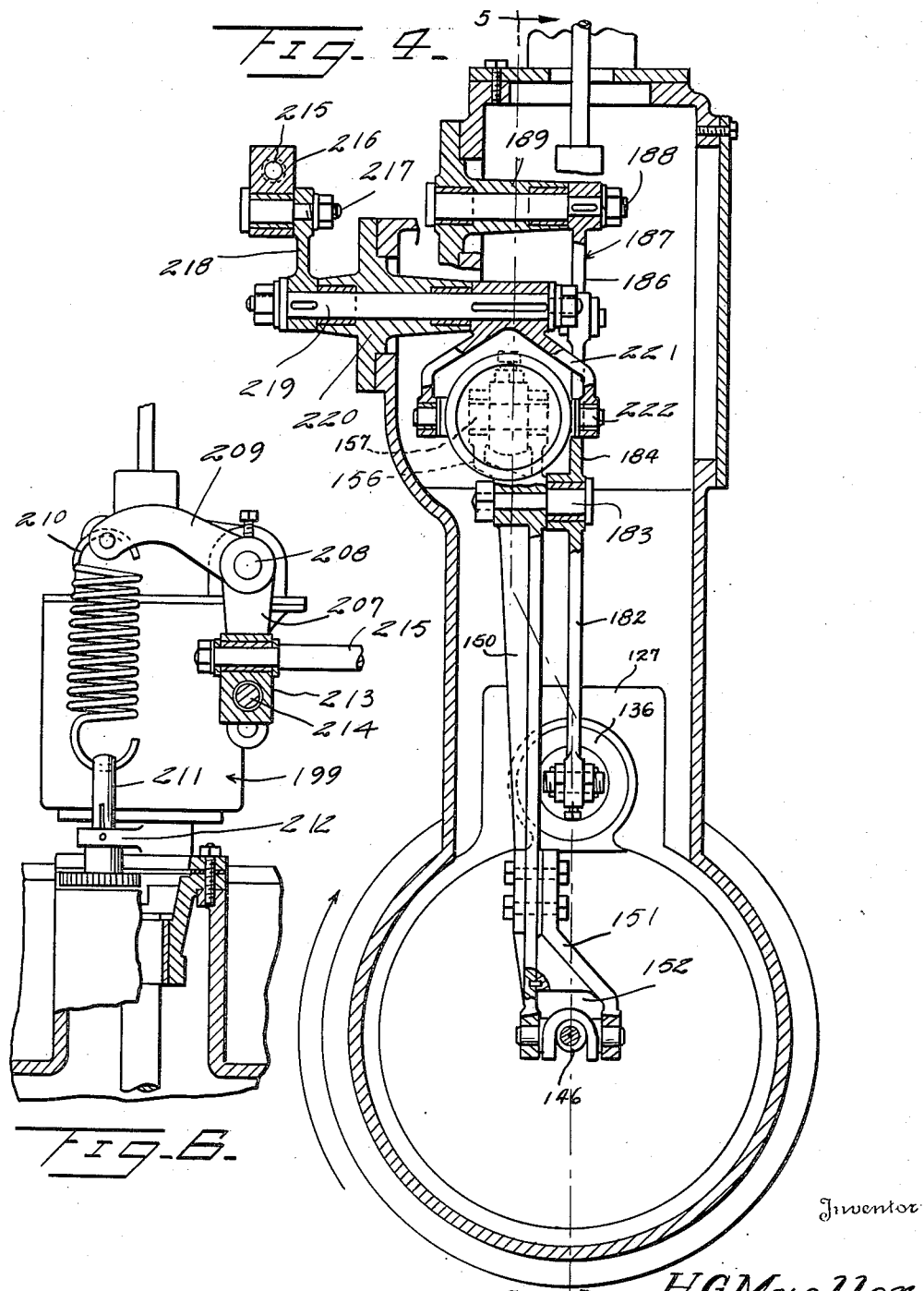

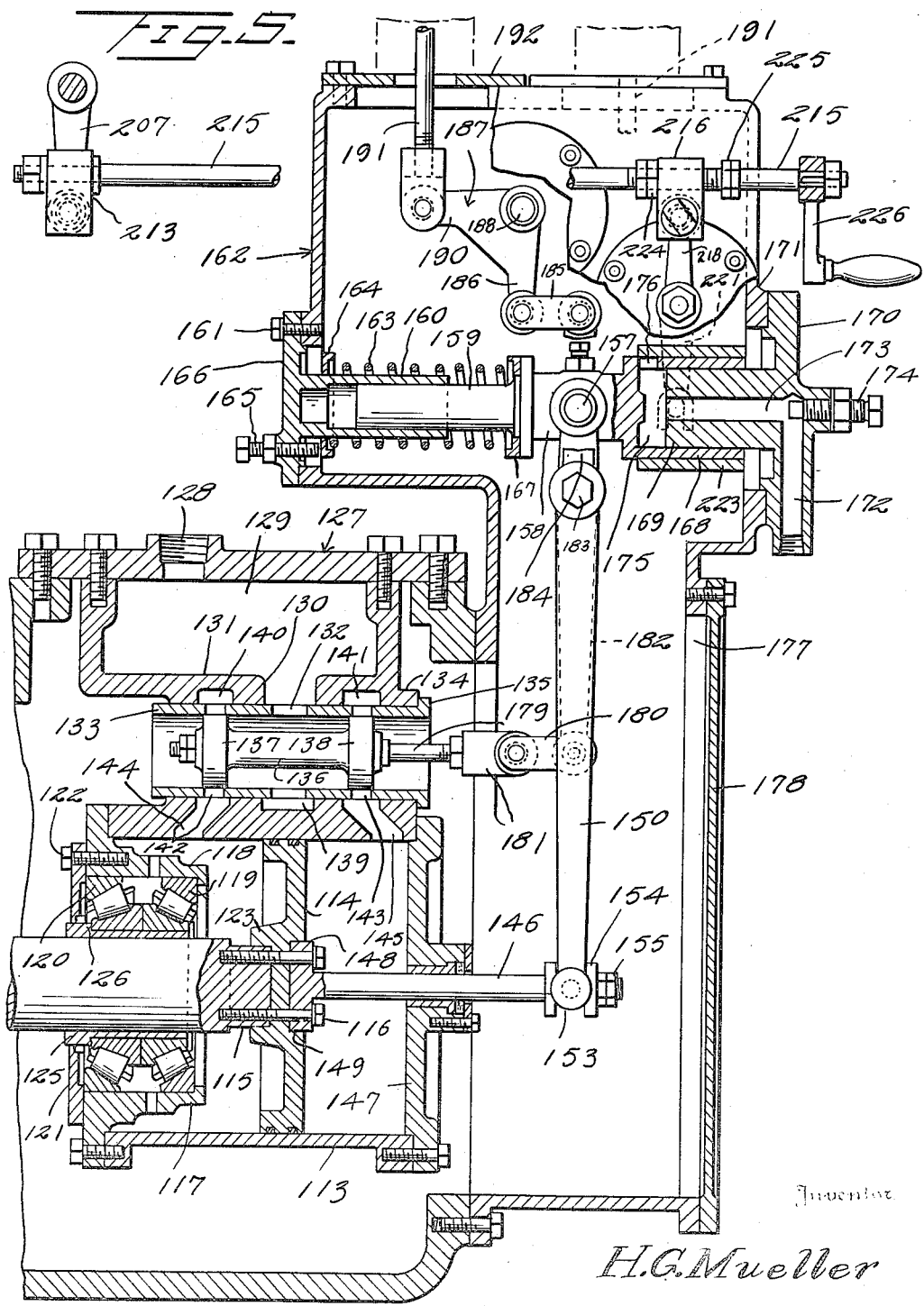

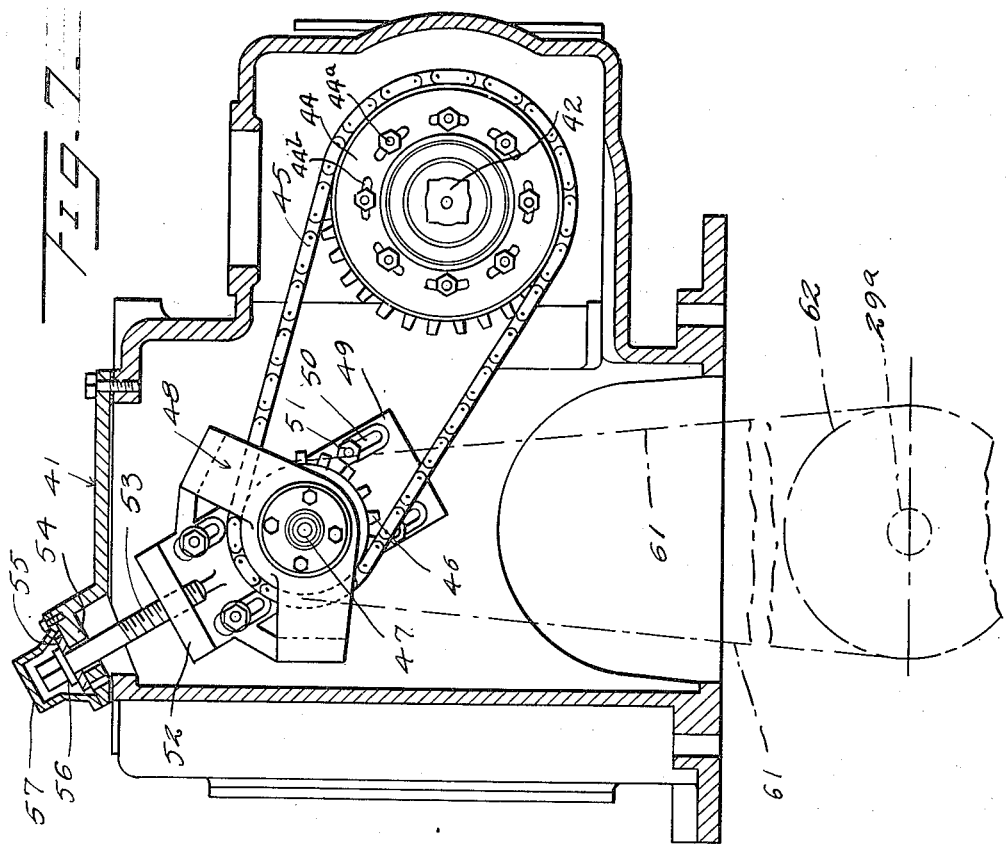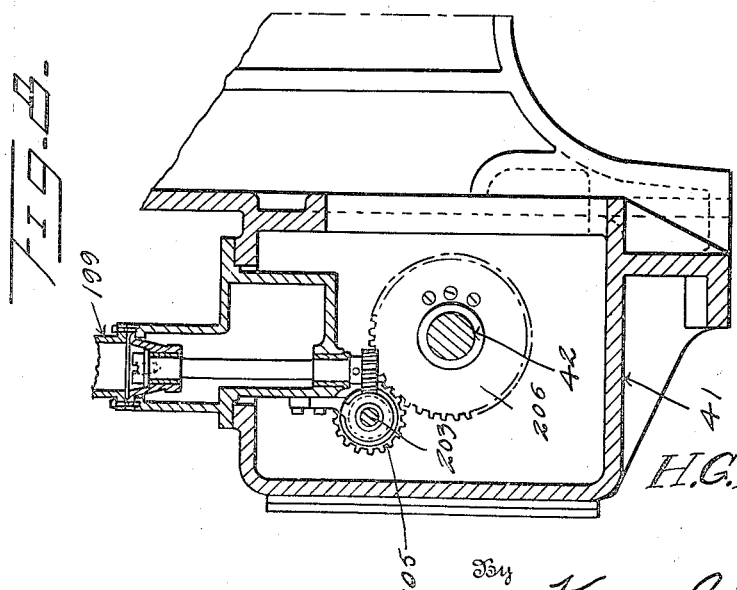

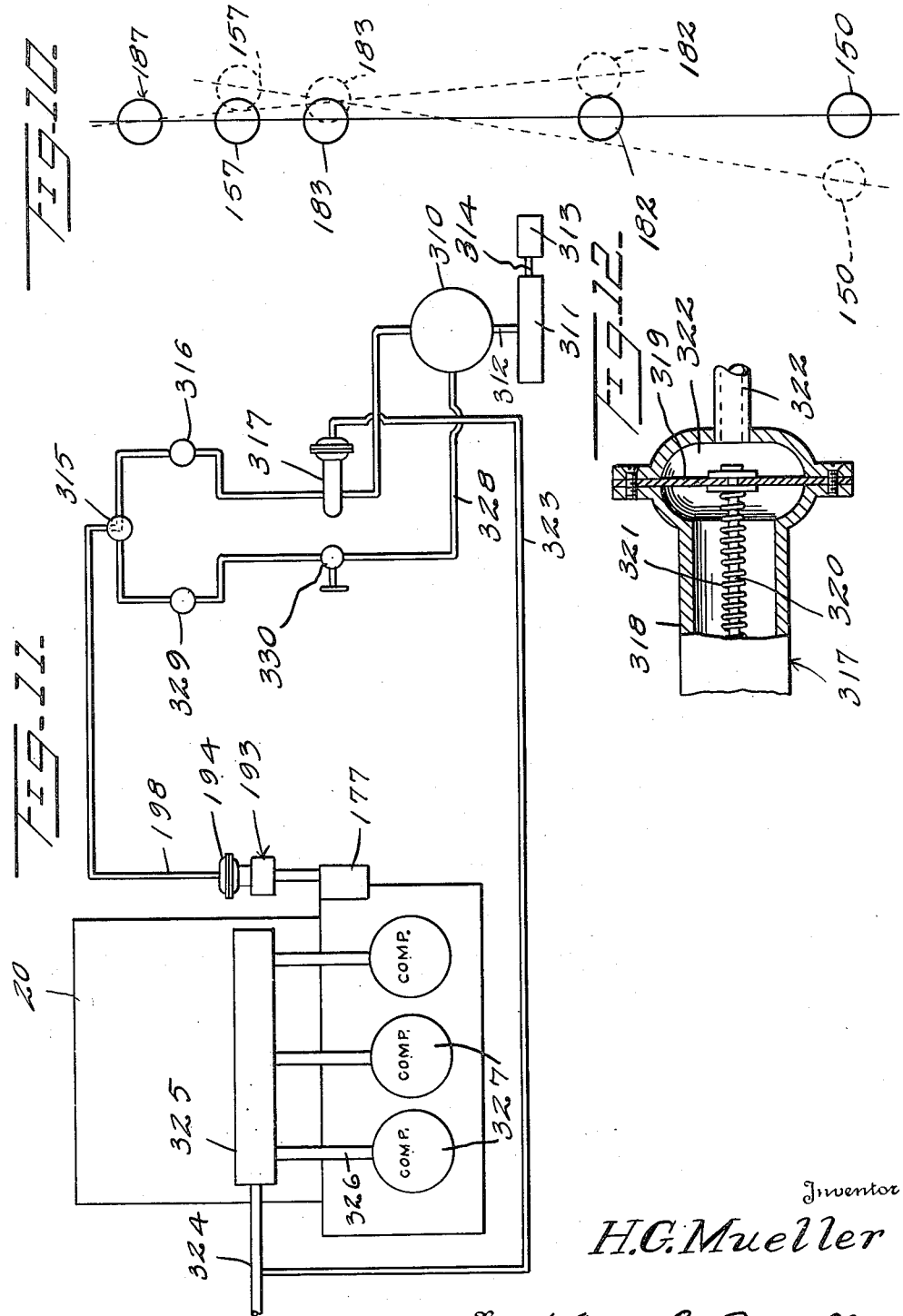

2,571,278

UNITED STATES PATENT OFFICE 2,571,278

FLUID PRESSURE MEANS FOR ADJUSTING THE VALVE GEAR FOR STEAM ENGINES

Herman Gundert Mueller, Erie, Pa.

Application July 11, 1947, Serial No. 760,227

9 Claims. (Cl. 121—162)

1

This invention relates to valve gearing for steam engines, and is a continuation in part of my copending application Serial No. 490,071, filed June 8, 1943, for Valve Gear for Steam Engines, and now abandoned.

An object of this invention is to provide a valve gear for a steam engine which is adaptable to units of multi-cylinder arrangements and which will give equal steam events at all cylinders at both high and low speed.

Another object of this invention is to provide an improved valve gear for a steam engine which will automatically vary the cutting off from a governor controlled by the fluid pressure or the fluid volume from a compressor or pump driven by the engine.

A further object of this invention is to provide an improved valve gear for a steam engine which will automatically control the cutoff from a centrifugal speed governor.

A further object of this invention is to provide an improved valve gear for steam engines having multiple cylinders which will adjust the cutoff to zero and shut the engine down in the event of failure of fluid pressure, such as failure of air or oil pressure.

A further object of this invention is to provide a valve gear for steam engines which are used to drive air compressors, the gear including an automatic speed control connected with the gear to regulate the cut-off in accordance with the air demand.

A further object of this invention is to provide in combination a steam engine, adjustable valve gear for the engine, an air compressor coupled to and operated by the engine, and means active upon variation of air pressure generated by the compressor for adjusting the valve gear.

A further object of this invention is to provide in combination with an adjustable valve gear, a hydraulic operator for adjusting the gear, the operator being controlled or regulated by means of a plurality of control or regulator devices, each of which is independently operable but certain ones of said devices are so correlated with certain others of said devices as to limit the effectiveness of the latter.

A further object of this invention is to provide in combination with an adjustable valve gear, a hydraulic operator for adjusting the gear, the operator being controlled or regulated by means of a plurality of control or regulator devices, certain ones of said devices being automatically operable, and each device being independently operable to a predetermined degree, with the operation of certain ones of said devices, beyond a pre-

2 determined degree of engine operation being limited by a correlated device, and with at least one of said devices being manually operated.

A further object of this invention is to provide in combination with an adjustable valve gear, a speed regulator connected with the valve gear, an automatic output regulator also connected with the valve gear, and a third automatic regulator correlated with the lubricating system, each regulator being independently operable, the third regulator being normally inactive when the lubricating pressure is normal, but being active upon failure of lubricating pressure to thereby move the valve gear to cutoff position.

With the foregoing objects and others which may hereinafter appear, the invention consists of the novel construction, combination and arrangement of parts as will be more specifically referred to and illustrated in the accompanying drawings, wherein are shown embodiments of the invention, but it is to be understood that changes, variations, and modifications may be resorted to which fall within the scope of the invention as claimed.

In the drawings:

Figure 1 is a vertical section partly broken away and in detail of a simple steam engine having mounted thereon a valve gear constructed according to an embodiment of this invention, Figure 2 is a sectional view partly in detail taken on the line 2—2 of Figure 1, Figure 3 is a vertical section partly broken away and in section showing the valve gear with the crank case and other housings removed, Figure 4 is a sectional view taken on the line 4—4 of Figure 2, Figure 5 is a sectional view taken on the line 5—5 of Figure 4, Figure 6 is a fragmentary side elevation partly in section of the centrifugal regulator, Figure 7 is a sectional view taken on the line 7—7 of Figure 2, Figure 8 is a sectional view taken on the line 8—8 of Figure 2, Figure 9 is a sectional view taken on the line 9—9 of Figure 3, Figure 10 is a diagrammatic illustration of the movement of the valve gear operating levers upon failure of oil pressure, Figure 11 is a diagrammatic view of a unit having a compressor and steam engine controlled according to this invention; and Figure 12 is a section through the air pressure reduction valve of Figure 11.

The engine 20 is constructed of a series of units, each embodying a cylinder and a slide valve, and each unit has correlated therewith a valve gear constructed according to an embodiment of this invention, to be hereinafter described. The engine 20 has secured to one side thereof a crankcase or housing 41 which is disposed above the main crankcase. The crankcase 41 has rotatable therein a crank member 42 which is rotatable in bearings 43 carried by the crankcase 41. The crankshaft 42 has secured to one end thereof a sprocket wheel 44, and a chain 45 is trained about the sprocket wheel 44 and is also trained about an idler sprocket 46. As shown in Figure 7, the idler sprocket 46 is mounted on a shaft 47 which is journalled through an adjustable bearing structure, generally designated as 48. Sprocket wheel 44 may be circumferentially adjusted relative to crankshaft 42 by means of adjusting bolts 44a which engage through elongated slots 44b.

A sprocket 60 is also fixed on the shaft 47 and is adapted to have trained thereabout a driving chain 61 which is trained about a driving sprocket 62 mounted on the adjacent end of the main crankshaft 29a. In the present instance, the sprockets 44, 46 and 60 are double sprockets with pairs of chains trained thereabout and the adjustment of the idler sprocket support 48 will provide for adjustment of the driving and driven chains 61 and 45 respectively.

The crankshaft 42 has formed therewith, or secured thereto, an offset 63 which is disposed at an angle to the length of the crankshaft, one end of the offset 63 starting from the plane of the center of the crankshaft and offset laterally thereof, and the other end extending angularly outwardly for the desired distance in order to provide for the necessary reciprocal movement of a valve connecting rod 64.

The upper end of the connecting rod 64 is rockably connected to a vertically slidable crosshead 32 which is slidable in a vertical guide 33 carried by the housing 41. The crosshead 32 also has secured thereto the lower end of a valve stem 31 which extends upwardly and outwardly from the guide 33 through a gland 70 and is connected to the valve 28.

In order to provide for maintaining the connection rod 64 against movement lengthwise of the crankshaft 42, I have provided at the lower end of each strap 69 a pair of adjustable tie members, generally designated as 79.

There are two of these tie members 79 for each strap 69 and the provision of the tie members provides a means whereby the lower end of the connecting rod 64 may be very closely adjusted relative to the inclined offset 63 in order that the operation of the valve of one unit may be accurately adjusted to balance with the operation of the valve of one or more adjacent units.

The crankshaft 42, as shown in Figure 3, is formed with a plurality of detachable units which are adapted to be coupled together by a coupling structure, generally designated as 101.

In order to provide for endwise adjustment of the crankshaft 42 I have provided a cylinder 113 which is disposed at one end of the crank case 41. The cylinder 113 has slidable therein a piston 114 which is mounted on a reduced stud 115 by means of fastening bolts 116 (Fig. 5). The stud 115 is formed at one end of one of the crankshaft members 42 and the crankshaft 42 is rotatable in a bearing structure, generally designated as 117. The bearing structure 117 includes a bearing housing 118 having disposed therein opposed roller bearing members 119 and 120. A plate 121 is secured by fastening members 122 to the outer end of the housing 118 and retains the bearing members 119 and 120 within the housing 118. The piston 114 is formed with a hub 123 which is adapted to abut against the inner bearing 119 when the piston 114 moves to the left. The movement of the piston 114 to the right is limited by means of a shoulder 124 (Fig. 2) carried by the crankshaft 42 and which is adapted to abut against a sleeve 125 disposed within the two bearings 119 and 120. The sleeve 125 is formed with an annular flange 126 abutting against the inner race of the bearing 120.

A pressure chest 127 is disposed above the cylinder 113 and is provided with an intake port 128 which is adapted to be connected to a source of fluid pressure and, in the present instance, is preferably connected to an oil pressure line, the oil under pressure being discharged into the chamber 129 within the chest 127. The chest 127 is formed with an outlet port 130 in the lower wall 131 thereof, and the outlet port 130 communicates with a port 132 which is formed in a valve sleeve 133. The valve sleeve 133 is mounted in an intermediate housing 134 and is formed at its outer end with a flange 135 abutting against the outer end of the housing 134. A slidable valve block 136 is mounted within the sleeve 133 and is formed with a pair of pistons 137 and 138.

The intermediate housing 134 is formed with an annular chamber 139 communicating with the outlet port 130 and is also formed with a pair of annular chambers 140 and 141 which communicate with pairs of diametrically opposed ports 142 and 243, respectively, formed in the sleeve 133. The port 142 communicates with a port 144 which also communicates with the interior of the cylinder 113, and the port 143 communicates with a port 145, the latter port communicating with the interior of the cylinder 113 on the side of the piston 114 opposite from the port 144.

A reduced diameter shaft 146 is slidable through the head 147 of the cylinder 113 and is formed at its inner end with a flange 148 which is seated in a recess 141 formed in the outer side of the piston 114. The fastening members 116 securing the piston 114 to the stud 115 also secure the flange 148 in the socket or recess 149. A rock lever 150 is formed at its lower end with a fork 151 (Fig. 4) having a U-shaped block 152 secured between the arms of the fork 151. The U-shaped block 152 engages the groove 153 (Fig. 5) of a grooved member 154 which is secured by fastening means 155 to the outer end of the reduced shaft or extension 146. The upper end of the lever or link 150 is also formed with a fork 156 which is rockably mounted on a pair of trunnions 157 carried by a slide member 158.

The slide member 158 includes a shaft 159 which is slidable in a cylindrical bearing 160 which is secured by fastening members 161 to a housing, generally designated as 162. The housing 162 extends upwardly from the housing or crank case 41. The slide member 158 is constantly urged to the right, as viewed in Figure 6, by means of a spring 163 which is disposed about the guide 160 and bears at one end against a flanged collar 164 abutting against the tensioning bolts 165 which are threaded through a flanged head 166 formed integral with the outer end of the guide member 160. The inner end of the spring 163 also bears against a flanged collar 167 abutting against the adjacent end of the slide member 158. The opposite end of the slide member 158 has formed integral therewith a cylindrical valve member 168 which is slidable on a stationary piston or guide 169. The piston or guide 169 is carried by a head or plate 170 secured to the outer wall 171 of the housing 162. The head 170 is formed with a vertically disposed oil duct or passage 172 which communicates with a horizontal passage 173. The horizontal passage 173 opens into the inner end portion of the cylindrical sleeve or valve member 168.

A threaded duct restricting member 174 is threaded into the head 170 at the meeting point of the two ducts 172 and 173 so that the amount of liquid entering the chamber 175 inwardly from the inner end of the stationary piston 169 may be regulated at the desired degree. The sleeve member or valve 168 is formed with an exhaust port 176 which communicates with the interior of the housing 162, and the interior of the housing 162 communicates with an end housing 177 having a removable plate 178. The horizontal adjustment of the slide member 158 regulates the position of the pivot members 157 for the lever 150 and also controls the operation of the valve member 136.

The valve member 136 has a valve stem 179 extending therefrom and a link 180 is pivotally connected at one end by means of a connector 181 to the outer end of the stem 179. The opposite end of the link 180 is pivotally connected to a depending valve operating lever 182. The lever 182 is rockably mounted on a pivot member 183 carried by the lever 150 below the pivot 157. The lever 182 is formed with an extension 184 extending above the pivot 183 which is pivotally secured at its upper end to a link 185. The link 185 is secured to the depending arm 186 of a bell crank 187. The bell crank 187 is pivotally mounted on a pivot member 188 carried by a supporting boss 189. The bell crank 187 has the opposite leg or side 190 thereof connected to the lower end of a diaphragm operated rod 191. The rod 191 extends upwardly through the top wall 192 of housing 162 and extends into an air pressure regulating device, generally designated as 193. The regulating device 193, shown in Figure 3, includes a housing 194 having disposed therein a diaphragm 195. The upper end of the rod 191 has mounted thereon a cap 196, and a spring 197 is interposed between the cap 196 and the bottom wall of the housing 194. The spring 197 is adapted to constantly maintain the upper end of the rod 191 in contact with the lower side of the diaphragm 195. Air pressure is admitted to the upper side of the diaphragm 195 through an air pressure pipe 198 which is connected to a source of air pressure supply, such as a compressor or the like which is independent of the compressor operated by the engine herein described and is termed the "master control."

The diaphragm 195 which is moved upwardly by means of the spring 197 is forced downwardly against the tension of spring 197 by air pressure from pipe 198 on the upper side of diaphragm 195. Pipe 198 is connected to an air pressure tank 310 (Fig. 11) and an air pump 311 is connected to the pressure tank 310 by means of a pipe 312. The pump 311 is operated by means of a prime mover 313 having the shaft 314 thereof connected to the pump shaft. The pump and power member herein disclosed are of conventional construction.

The pipe 198 between the tank 310 and the operator 193 has interposed therein a three-way valve 315 and a pressure gauge 316 is also interposed in the pipe 198 between valve 315 and pressure tank 310.

A diaphragm operated valve 317 is interposed in pipe 398 between gauge 316 and 310 and is formed as shown in Figure 12 of housing 318 having a diaphragm 319 secured thereto and connected to a valve stem 320. A spring 321 disposed about the stem 320 is adapted to urge the diaphragm 319 and the valve on the stem 320 to open position. The housing 318 includes a pressure chamber 322 on the outer side of the diaphragm 319, and a pipe 323 communicates chamber 322 with the service pipe 324 which is connected to the compressor manifold 325. The compressor manifold is connected by means of connecting pipes 326 to compressors 327. As shown in Figure 11, there are three compressors 327 which are connected to the common manifold 325.

When pressure increases in manifold 325 and the service pipe 324 due to decrease in demand for the gas or other fluid compressed by the compressors, this increased pressure will be communicated by pipe 323 to diaphragm chamber 322, thereby flexing diaphragm 319 inwardly and causing a reduction in the air pressure being communicated by pipe 198 from pressure tank 310 to diaphragm 195 of the valve gear operator. In the event the gas or fluid pressure in service line 324 should be reduced by increased consumption of the gas or fluid, pipe 323 will communicate the reduced fluid pressure to diaphragm chamber 322 of regulating member 317 and spring 320 will move the valve stem or regulating rod 320 outwardly, opening regulator 317 and increasing the air pressure to the upper side of diaphragm 195. Increased pressure on the upper side of diaphragm 195 will cause this diaphragm to flex inwardly and inward flexing of this diaphragm will effect adjustment of the valve gear structure by rocking of bell crank 187. In this manner the engine and compressors will operate under accurate regulation, the operation of the engine being dependent on the increase and decrease in the demand for the gas or fluid compressed by the compressors 327.

In order to provide for the manual operation or regulation of the valve gear operator 193 I have provided a shunt pipe 328 which is connected at one end to air pressure tank 310 and is connected at the other end to three-way valve 315. A pressure gauge 329 is interposed in pipe 328 between tank 310 and valve 315, and a manual cutoff valve 330 is also interposed in pipe 328 between gauge 329 and tank 310.

In the use and operation of the control means when the engine is initially started operation valve 315 is turned so as to communicate operator 193 with tank 310 through pipe 198 and pipe 328. Valve 330 is then adjusted to provide for the desired valve gear adjustment through valve gear operator 193. After the engine has started its operation and has picked up sufficient speed, valve 315 may be turned so as to communicate operator 193 with tank 310 through pipe 198 and indirect regulator or reducing valve 317.

In the event that the demand for gas or other fluid pressure compressed by the compressors 327 increases, resulting in a decrease of gas or fluid pressure in service line 324 and manifold 325, this decreased pressure will be communicated to chamber 322, and spring 321 will thereupon flex diaphragm 319 outwardly and adjust the reducing valve structure 317 so as to provide for increased air pressure from tank 310 to operator 193. This increased pressure on the upper side of diaphragm 195 will move valve gear adjusting rod 191 inwardly and inward movement of rod 191 will effect adjustment of the valve gear mechanism to provide for increased speed in the engine and similarly increased speed in the compressors.

The endwise position of the crankshaft 42 is also controlled by means of a centrifugal governor 199 (Fig. 3). The governor 199 is of conventional construction and includes a rotatable shaft 200 having secured to the lower end thereof a worm 201 which meshes with a worm gear 202 (see Figure 2) carried by a gear shaft 203 rotatable in a bearing 204. The shaft 203 has fixed thereon a spur gear 205 meshing with a spur gear 206 which is fixed to the crankshaft 42. The gear 205 is elongated so that the gear 206 will be in a constant mesh with the gear 205 in any adjusted position of the crankshaft 42.

The governor 199 includes a rockable regulating arm 207 mounted on a pivot 208 (Figure 6). This arm 207 also has fixed relative thereto an angularly disposed arm 209 with which one end of a spring 210 is connected. The spring 210 has the opposite end thereof connected to a spring tensioning member 211 which is threaded through a lug 212 carried by the lower portion of the governor 199. A block 213 is pivotally mounted on a pivot member 214 carried by the arm 207 and one end of an elongated regulating rod 215 is mounted in the block 213 and is disposed at a right angle to the axis of the pivot member 214. The rod 215 is threaded through a block 216 which is pivotally mounted as at 217 on the upper end of a lever 218 (Figs. 4 and 5). The lever 218 is secured to the outer end of a rock shaft 219 which is rockably mounted in a bearing 220. The rock shaft 219 has keyed thereto a shifting fork 221. The arms of the fork 221 pivotally engage trunnions 222 which are carried by a cylindrical valve 223. The valve 223 slidably engages the outer side of the cylindrical valve 168 and during the normal running of the engine the sleeve valve 223 is adapted to close the exhaust port 176. The rod 215 has threaded thereon adjusting nuts 224 and 225 which engage on opposite sides of the block 216 and the terminal end of the rod 215 has secured thereto a hand crank 226. The hand crank 226 is provided so that the operation of the sleeve 223 may be manually regulated or operated without operation of the governor 199.

In Figure 5 there is shown in dot and dash lines an alternate position for the air controlling rod 191. In this position the rod 191 is rearwardly from the full line position and the bell crank 190 is turned around 180° so that the leg 190 will extend to the right, as viewed in Figure 5. In this position of the controlling rod 191, in the event of air failure which in the full line position would reduce the cut-off and shut down the machine, the controlling rod 191 would in the dot and dash position advance the cut-off and speed up the engine which would then be regulated by the overspeed control or centrifugal governor 199.

Procedure for starting engine. First operation. Start up the oil pump and establish the oil supply through the main pilot valve and the oil failure control cylinder. The next operation is to apply manually on top of the diaphragm of the air control element sufficient air pressure, about twenty pounds, to depress the diaphragm and spring, and move the valve control piston automatically by oil pressure to the right a sufficient amount for long starting cut-off.

The throttle is then opened slightly, after opening all the cylinders traps and steam line, and the machine is turned over slowly, possibly 50 R. P. M., for circulating the steam through the cylinders for warming up and also draining all water. At this low speed, the over-speed centrifugal governor 199 will be wide open, or against the stop, the spring tension on the adjusting screw being far greater than the centrifugal force. This position of the centrifugal governor, that is with the arm 209 in its lowermost position (Figure 6), is the normal operating position of that governor, which at all speeds below 350 R. P. M. merely acts as a positioning lever for the hand control rod 215 and the sleeve valve 223. The oil pressure supplied from the oil pump through passage 172 will move slide 158 slightly to the left, against the pressure of spring 163, until the leakage of oil through port 176 reduces the oil pressure sufficiently to balance the spring tension. The amount of this leakage is governed by adjusting screw 174, choking the oil in passage 173. This adjustment then fixes the position of slide 158 and pivot 157 for normal operating conditions on the pressure control diaphragm regulator 193, as long as sleeve 223 is held in a fixed position by the spring loaded over-speed governor 199, and with a more or less constant oil pressure in chamber 175.

After the machine is thoroughly warmed up and ready to go on the line, the spring loaded air pressure regulating device 193 is switched on automatic or master control, by rotating the three way valve 315 to place the line 198 in communication with the air pressure tank 310 through the reducing valve 317 which will then automatically adjust the cutoff, so that the throttle can be opened wide and full pressure applied to the machine, and the unit is then under normal automatic control by cutoff. The reducing valve 317 regulates the pressure on the diaphragm 195 of the air pressure regulating device in accordance with the air demand, the air pressure increasing with increased demand.

The normal functioning of the machine on cutoff control from the regulator 193 is as follows:

Assume that the speed of the machine is balanced against the demand of the gas being compressed, the machine will then run at constant speed on a constant cutoff, and the spring 197 just balancing the air pressure on diaphragm 195. Then assume that the demand for compressed gas decreases, this will increase the pressure in chamber 322 of the reduction valve 317 causing the valve to decrease the flow of compressed air from the tank 310 to the regulator 193, the air pressure on diaphragm 195 will drop slightly causing the diaphragm and rod 191 to rise slightly. Since pivot 157 is held stationary, lever 182 will move valve 136 slightly to the right, establishing communication between chamber 129 and cylinder 113 on the right side of piston 114, and opening the left side of cylinder 113 through port 142 and the open left end of sleeve 133, to housing 41.

The fluid pressure on the right side of piston 114 will cause valve gear crankshaft 42 to move to the left or to a reduced cutoff position. This will also cause lever 150 to move to the left, carrying pivot 183 with it, which will swing lever 182 to the left until valve 136 again closes ports 143 and 142, hydraulically locking piston 114 from further movement and fixing the cutoff momentarily at a reduced value. If this cutoff is still too great to balance the reduced compressor gas demand, the diaphragm will be further depressed and the operation repeated until the cutoff reaches a value which will balance the compressed gas demand.

Conversely, if the compressed gas demand increases the air pressure on diaphragm 195 will increase, lowering rod 191 and moving valve 136 to the left, establishing communication between chamber 129 and the left side of piston 114 and relieving oil pressure on the right side through port 143 and the right open end of bushing 133. This will move the valve gear cranks 42 to the right, increasing the cutoff and speeding up the machine and will move lever 150 to the right and move valve 136 to the right, again closing ports 142 and 143 and again hydraulically locking piston 114.

Thus, the compressed gas demand is always balanced by increasing or decreasing the steam cutoff, thereby increasing or decreasing, respectively, the speed and supply of compressed gas automatically and independently of the other controls which remain stationary under this normal operating condition.

Assume, now, that a temporary demand on the machine exceeds the capacity of the machine, causing the air pressure on the top of the diaphragm to be automatically increased by the automatic control to bring the valve gear into maximum cutoff position; this will cause the speed to increase up to 350 R. P. M., which is the maximum speed of this particular machine. The spring tension on the over-speed governor is adjusted so that at this maximum speed the centrifugal force of the fly balls overcomes the spring tension, raising the lever 209 to thereby move the sleeve valve 223 to the right, opening port 176 and permitting the oil pressure in the cylinder 168 to be reduced, the oil flowing out of port 176.

At this instant spring 163 will move slide 158 to the right and valve 136 will move to the right, thereby establishing communication between chamber 129 and cylinder 113 on the right side of piston 114. Fluid pressure on the right side of piston 114 will cause valve gear crankshaft 42 to move to the left, or to reduced cutoff position. The reduced cutoff position of crankshaft 42 will reduce the engine speed and again return the valve 136, closing the ports 142 and 143 in similar manner to that described above.

During this operation the diaphragm remains constantly in extreme lowermost position, since the demand is more than the capacity of the machine at its maximum speed. It remains in this position because the demand will not be satisfied and thus holds rod 191 down the link 185 to the right in a fixed position, and lever 182 is then actuated by movement of slide 158 with pivots 157 and 183. The operation of valve 136 and piston 114 is then repeated as described above under pressure regulation, but in this case is controlled by the centrifugal governor moving sleeve 223 to the right or the left, as the speed increases or decreases, respectively.

The tension of spring 163 and the oil pressure in chamber 175 wil cause slide 158 to follow the sleeve by opening or closing port 176. Thus, the speed is controlled at the maximum of 350 R. P. M. for which the spring 210 is adjusted whenever the demand exceeds the maximum supply. This also furnishes a constant speed control below the maximum speed, if desired, by adjusting the tension on spring 210 to the speed desired and holding the air diaphragm 195 in a fixed position, either extreme downward position with full air pressure on the diaphragm, or extreme upward position with the air shut off. In either position the cutoff control will operate as described above from the centrifugal governor at a constant speed for which the tension on spring 210 is adjusted.

If it is desired to manually control the speed by manual cutoff, below the speed for which the tension on spring 210 is set (and in which case arm 209 will remain in a fixed position) and with the diaphragm in a fixed position, either extreme upward or downward, this is accomplished by the hand wheel 226 moving block 216 to the right or to the left, which will move sleeve 223 to the left or the right, respectively, positioning the valve cranks 42 in a corresponding position and giving the machine a fixed cutoff set by the hand wheel. If, with such a manually set fixed cutoff, the demand increases, the pressure will fall, and the machine will speed up until the centrifugal governor again comes into operation at the maximum speed for which it is set.

In case the oil supply, which may be taken from the main oiling system of the machine, fails, then the pressure in chamber 175 will drop to a minimum and permit spring 163 to move slide 158 to the right, forcing the oil in chamber 175 back through the supply passage 172. Thus, the pivot 157 will move to the right until cylinder 168 stops against plate 170, reducing the cutoff to the minimum and shutting down the machine. This will function independently of sleeve 223 or the position of stem 191 and will shut down the machine regardless of either the speed governor or the pressure regulator or the hand control lever.

As pivot 157 moves to the right under the tension of spring 163, lever 182, being held at its upper end by links 185 and bell crank 187, will rock to the right at its lower end on pivot 183 moving valve plug 136 to the right and opening ports 144 and 145 to exhaust and intake ports 142 and 143 respectively. The chamber to the left of the valve control piston 114 will then be opened to the exhaust port and the oil in that chamber wil not resist the inherent tendency of the shaft 42 to move to the left or the cut-off position because of the slant of the crank pins 63.

By providing a hydraulic operator for moving the valve gear crankshaft endwise, it is possible to provide various types of regulators or controls for effecting the desired engine operation which were not heretofore possible with other types of valve gear structures. The crankshafts 42 has been herein disclosed as terminating at one end in a plane co-planar with the axis of the crankshaft thereby providing an engine which will operate in only one direction. When it is desired to provide for the reverse operation of the engine, the offset 63 on the crankshaft may be extended in an opposite direction, as disclosed in my prior patent supra.

What I claim is:

1. In combination a steam engine comprising a cylinder, a piston working in said cylinder, a main crankshaft, means connecting said main crankshaft with said piston, a sliding valve correlated with said cylinder, and valve gear means connected with said sliding valve, a second cranking shaft having an offset, means supporting said second crankshaft for rotation and for endwise adjustment, means connecting the offset of said second crankshaft with said sliding valve, a second sliding valve for effecting endwise movement of said second crankshaft, fluid pressure means for adjusting said second sliding valve endwise, centrifugal means for regulating the operation of said fluid pressure means, and spring tensioned means correlated with said fluid pressure means effecting endwise shifting of said second sliding valve to a speed reducing position upon failure of fluid pressure.

2. In combination a steam engine including a movable operating valve, valve gear connected with said valve, fluid pressure means for adjusting said valve gear, centrifugally controlled means connected with said valve gear for regulating the movement of said valve, oil pressure means for regulating the movement of said valve, and normally inactive spring pressed means connected with said first means for automatically adjusting said valve gear to a speed reducing position upon failure of oil pressure.

3. In a steam engine, a reciprocal operating valve, liquid pressure means connected with said valve for regulating the reciprocal movement of said valve, a centrifugal regulator for said means, and air pressure operated means also connected with said first means, said air pressure operated means including normally inactive spring means for effecting reduction of valve movement upon reduction of air pressure, said liquid pressure means also including normally inactive spring means for effecting reduction of valve movement upon reduction of liquid pressure.

4. In a steam engine, in combination, a reciprocal operating valve, means for reciprocating said valve, said means including means for varying the movement of said valve, a centrifugal regulator connected to said latter means, spring means connected with said first means for urging said first means to a position reducing the reciprocal movement of said valve, and fluid pressure operated means for normally holding said spring means inactive.

5. In combination a steam engine having a reciprocal operating valve, valve gear connected with said valve, means for adjusting said valve gear to vary the reciprocation of said operating valve, means regulating the operation of said adjusting means in accordance with the speed of said engine, spring-pressed means connected to said regulating means constantly urging the latter to a position reducing the valve reciprocation, oil pressure means connected to said spring-pressed means and to said engine for effectively holding said spring-pressed means inactive, said spring pressed means upon failure of oil pressure effecting regulation of the adjustment of said valve gear in a direction to reduce engine speed, a second spring-pressed means also connected to said adjusting means constantly urging the latter to a position to vary the reciprocation of said valve, and air pressure means correlated with said second spring-pressed means for normally holding the latter inoperative.

6. In a steam engine having a reciprocal sliding valve, valve gear for varying the reciprocal movement of said valve, said valve gear comprising a crankshaft having an angularly inclined offset, means slidable on said offset connecting said crankshaft with said valve, a cylinder at one end of said crankshaft, a piston fixed to said crankshaft and slidable in said cylinder, a valve housing fixed to and communicating with said cylinder, a valve member slidable in said housing, a slide member above said housing, supporting means for said slide member, a lever pivotally secured at one end to said slide member, means connecting the other end of said lever with said crankshaft, a second lever pivotally secured intermediate the ends thereof to said first lever below the pivotal mounting of the latter, means connecting one end of said second lever to said valve member, fluid pressure regulating means connected with the other end of said second lever for rocking the latter to thereby effect movement of said second valve and admit fluid pressure on one side of said piston, a spring constantly urging said slide member in one direction, pressure operated means for normally holding said slide member against movement by said spring, and centrifugally operated valve means correlated with said pressure operated means for regulating the effectiveness of said pressure operated means.

7. In a steam engine having a reciprocal sliding valve, valve gear for varying the reciprocal movement of said valve, said valve gear comprising a crankshaft having an angularly inclined offset, means slidable on said offset connecting said crankshaft with said valve, a cylinder at one end of said crankshaft, a piston fixed to said crankshaft and slidable in said cylinder, a valve housing fixed to and communicating with said cylinder, a valve member slidable in said housing, a slide member above said housing, supporting means for said slide member, a lever pivotally secured at one end to said slide member, means connecting the other end of said lever with said crankshaft, a second lever pivotally secured intermediate the ends thereof to said first lever below the pivotal mounting of the latter, means connecting one end of said second lever to said valve member, fluid pressure regulating means connected with the other end of said second lever for rocking the latter to thereby effect movement of said second valve and admit fluid pressure on one side of said piston, a spring constantly urging said slide member in one direction, pressure operated means for normally holding said slide member against movement by said spring, a cylindrical regulating valve for said pressure operated means, and a centrifugal operator connected to said regulating valve.

8. In a steam engine having a reciprocal sliding valve, valve gear for varying the reciprocal movement of said valve, said valve gear comprising a crankshaft having an angularly inclined offset, means slidable on said offset connecting said crankshaft with said valve, a cylinder at one end of said crankshaft, a piston fixed to said crankshaft and slidable in said cylinder, a valve housing fixed to and communicating with said cylinder, a valve member slidable in said housing, a slide member above said housing, supporting means for said slide member, a lever pivotally secured at one end to said slide member, means connecting the other end of said lever with said crankshaft, a second lever pivotally secured intermediate the ends thereof to said first lever below the pivotal mounting of the latter, means connecting one end of said second lever to said valve member, fluid pressure regulating means connected with the other end of said second lever for rocking the latter to thereby effect movement of said second valve and admit fluid pressure on one side of said piston, a spring constantly urging said slide member in one direction, a stationary piston coaxial with said slide member, a cylinder fixed to said slide member slidably engaging said stationary piston and having a port therein, said stationary piston having a fluid passage therein opening into said latter cylinder whereby fluid under pressure may be discharged into said cylinder to move said slide member against the tension of said spring, a sleeve valve slidable on said latter cylinder and adapted to close said port to thereby retain fluid pressure in said latter cylinder, and centrifugal means for regulating the position of said sleeve valve.

9. In a steam engine, a reciprocal operating valve, liquid pressure means connected with said valve for regulating the reciprocal movement of said valve, a centrifugal regulator for said means, and air pressure operated means also connected with said first means, said air pressure operated means including normally inactive spring means for effecting reduction of valve movement upon variation of air pressure, said liquid pressure means also including normally inactive spring means for effecting reduction of valve movement upon reduction of liquid pressure.

HERMAN GUNDERT MUELLER.

REFERENCES CITED

The following references are of record in the file of this patent:

UNITED STATES PATENTS

| Number | Name | Date |
| --- | --- | --- |
| 431,735 | Armstrong | July 8, 1890 |
| 1,185,317 | Herr | May 30, 1916 |
| 1,471,317 | Emmet | Oct. 16, 1923 |
| 2,230,263 | Read | Feb. 4, 1941 |
| 2,364,352 | Dodson | Dec. 5, 1944 |